United States Patent [19]

Cale, Jr.

[11] 4,414,726

[45] Nov. 15, 1983

[54] METHOD OF MANUFACTURING CLEVIS END CONNECTING ROD

[76] Inventor: Roland E. Cale, Jr., 732 Lakeview Ave., Cortland, Ohio 44410

[21] Appl. No.: 283,945

[22] Filed: Jul. 16, 1981

[51] Int. Cl.³ .................... B23P 15/00; B23K 31/00
[52] U.S. Cl. ............................ 29/156.5 A; 29/175 A; 403/157; 74/579 R; 228/155; 228/160; 228/182
[58] Field of Search ............... 29/156.5 A, 175 A, 11; 72/324; 228/155, 182, 141.1, 159–161; 74/579 R; 403/157, 158, 159; 59/86

[56] References Cited

U.S. PATENT DOCUMENTS

| 680,218 | 8/1901 | Blakeslee | 74/579 R |
|---|---|---|---|
| 1,067,362 | 7/1913 | Miller, Jr. | 29/412 |
| 1,391,792 | 9/1921 | Recker | 29/412 |
| 1,470,120 | 10/1923 | Schaefer | 74/579 R |
| 1,657,875 | 1/1928 | Wright | 29/156.5 A |
| 1,784,966 | 12/1930 | Johnson | 29/175 A |
| 2,019,460 | 10/1935 | Mahan | 74/579 R |
| 2,458,989 | 1/1949 | George | 72/324 |
| 2,512,688 | 6/1950 | Skog | 29/412 |

FOREIGN PATENT DOCUMENTS 966858 10/1950 France ..................... 29/156.5 A

Primary Examiner—Daniel C. Crane
Attorney, Agent, or Firm—Carothers & Carothers

[57] ABSTRACT

A clevis end connecting rod such as truck lever connection rods, brake cylinder push rods, brake rod ends, etc., utilized on railroad cars, is manufactured by positioning an outside side surface of a metal eye member, having a bore therethrough, transversely against one end of a metal rod, and then the metal rod end is circumferentially welded to the eye member side surface with a good concentric and coaxial uniform weld. Thereafter, the eye member is transversely cut in half, thereby providing a cutting gap which is in line with the axis of the rod. Then this same end of the rod is axially cut to a predetermined depth to provide a bifurcated rod end. The bifurcation is aligned with the cutting gap between the eye member halves, and then the bifurcated rod end is spread and re-shaped to form a clevis end with the bores of the eye member halves being positioned in spaced alignment to receive a clevis pin, thereby eliminating expensive prior art hot forging techniques. As a modification to the method, the eye member may be provided initially in two halves, prior to the step of positioning and welding it to the end of the metal rod. This latter technique is especially useful where a plurality of transverse clevis pin bores are provided in the eye member for adjustable clevis pin connection, thereby requiring a relatively long clevis eye member, which would require considerably more time to be transversely cut in half. The rod end which is welded to the eye member is preferably tapered to provide an annular welding relief between the rod end and the eye member to provide a uniform concentric or coaxial weld prior to the step of making a bifurcation cut into the end of the rod through the weld.

9 Claims, 7 Drawing Figures

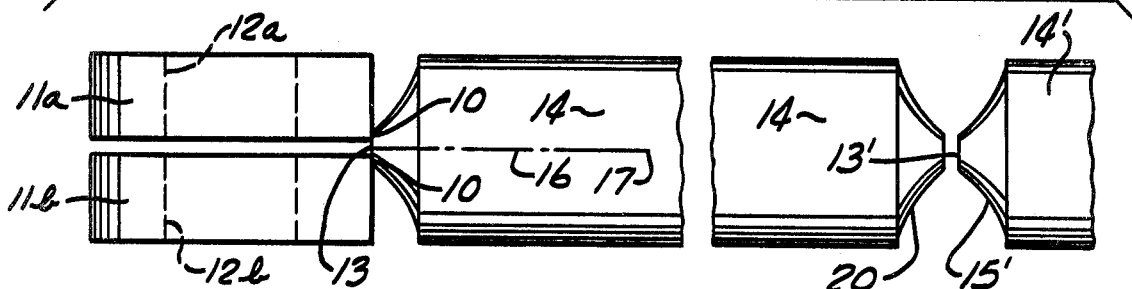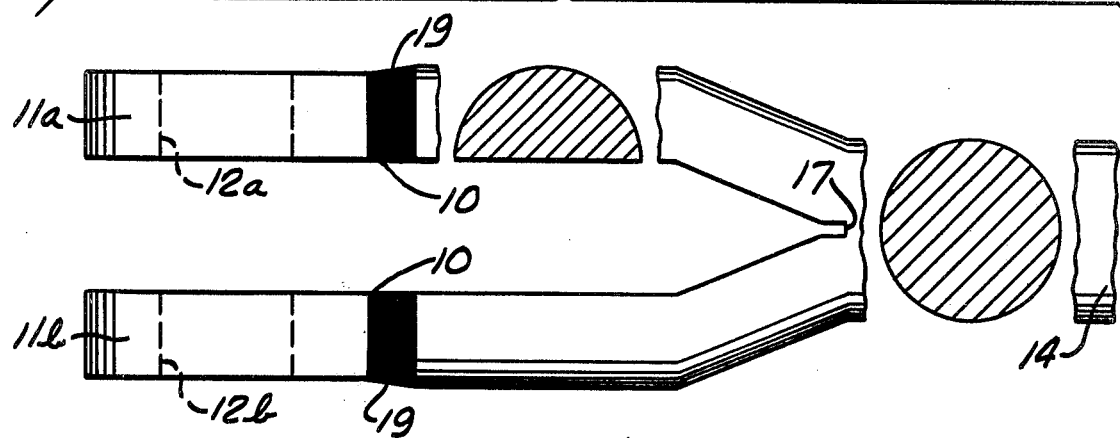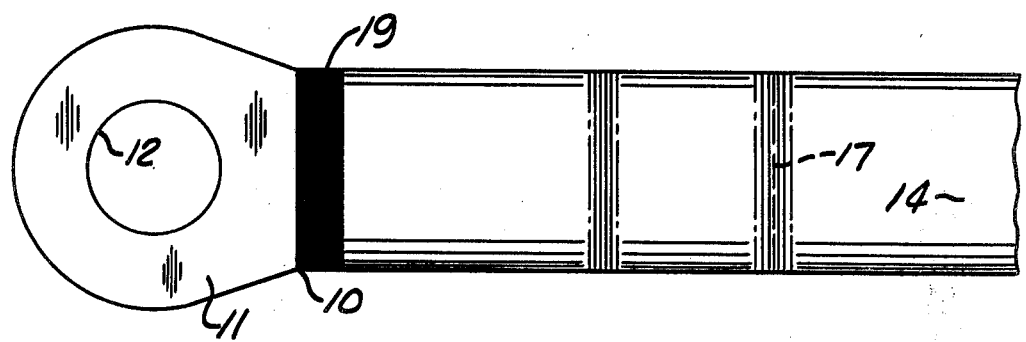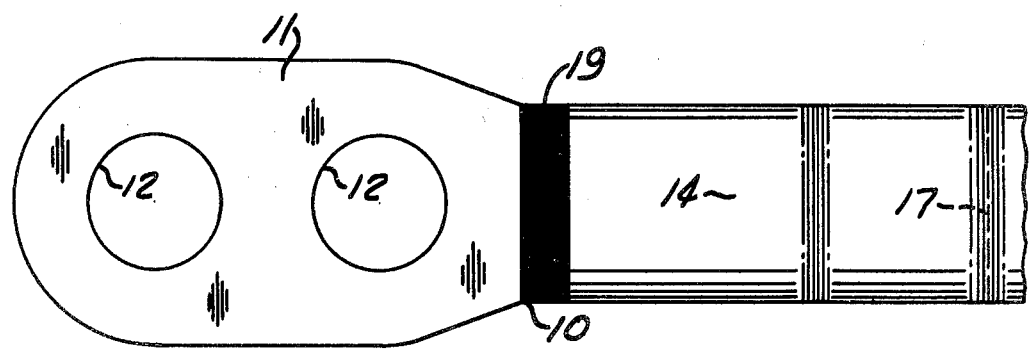

METHOD OF MANUFACTURING CLEVIS END CONNECTING ROD

BACKGROUND OF THE INVENTION

The present invention relates generally to a method of manufacturing a clevis end connecting rod.

In railroad car trucks, the use of a number of different clevis end connecting rods is required, particularly for the braking mechanism and brake linkage. For example, truck lever connection rods, brake cylinder push rods, and brake rod ends are required for interconnecting the brake linkage. All of these rods have a clevis end at at least one end of the connecting rods, which is bifurcated and has spaced aligned holes for connection to another linkage member. Some of the clevis ends are provided with a plurality of spaced transverse clevis pin holes or bores to permit adjustable clevis pin connection for different required lengths of connecting rods in the linkage system.

These brake rods and connections are generally manufactured or fabricated by hot drop forge techniques. In other words, the clevis end of the rods are formed from enlarged ends of a basic metal rod by forging techniques. This provides a very adequate and strong clevis end brake rod or connecting rod; however, the method of manufacture with hot forging techniques is extremely expensive and energy consuming.

It is a principal object of the present invention to manufacture a clevis end brake rod or connecting rod strictly by cold working techniques, with the exception of welding, to provide a less expensive brake rod or connecting rod which is equally as strong as the prior art members.

SUMMARY OF THE INVENTION

A metal rod connecting member having at least one bifurcated clevis end aligned with transverse bores to receive a connecting or clevis pin therethrough is manufactured in accordance with the teachings of the method of the present invention by positioning an outside side surface of a metal eye member, having a bore therethrough, transversely against one end of a metal rod and this one rod end is then uniformly and circumferentially welded to the eye member side surface. Preferably, this one end of the rod is tapered to provide an annular welding relief thereabout so that a good, uniform and continuous annular and concentric weld may be effected between the rod end and the eye member. This assures an excellent weld connection.

After welding, the eye member is then transversely cut in half to provide a gap therebetween which is in line with the axis of the rod, then the same welded rod end is axially cut to a predetermined depth to provide a bifurcated rod end, with the bifurcation gap of the rod being aligned with the gap previously provided or cut between the eye member halves. The bifurcated rod end is then spread and re-shaped by cold working to form a clevis end with bores of the eye member halves in spaced alignment in order to receive a clevis pin.

Thus, by first welding a good uniform annular weld between the rod end and the eye prior to cutting the rod end in half, it is assured that a good weld connection is obtained, as opposed to welding the eye member halves separately to a bifurcated rod end. In addition, no expensive hot forging techniques are required, thus saving considerable energy and manufacturing costs, yet providing a connecting rod member which is more than adequately strong to replace the old or prior art type rods which have forged clevis ends. In addition, the concentric or coaxial weld between the rod end and the eye member about the rod axis provides easy, uniform welding techniques to facilitate automation of welding.

In addition, prior art forging techniques are not only expensive to operate, but the forging equipment is extremely expensive, whereas the cutting operations carried out in the manufacture of rod members with bifurcated ends in accordance with the techniques of the present invention may be done with relatively inexpensive cutting machines, such as reciprocating or band saws, and the manpower required to manufacture the end product is considerably reduced. In addition, material waste is minimal. Thus, all forming and cutting in accordance with the method of the present invention is done in a cold state as opposed to hot forging, and therefore the cost of all machinery involved is moderate as compared to prior art techniques of manufacture.

In some instances, multiple clevis pin bores or eyes are desired in the clevis end of the connecting rod or brake rod in order to provide an adjustable clevis pin connection to adjustably change the effective length of the connecting rod or member. When manufacturing such a connecting rod in accordance with the techniques of the method of the present invention, the aforedescribed method steps may be altered such that the aforedescribed step of cutting the eye member in half is instead accomplished by providing the eye member initially in two halves prior to the step of positioning and welding the uncut rod end to the eye member. This eliminates the additional requirement of having to transversely cut the eye member in half after the step of welding the rod end to the eye member.

In another modification, the side surface of the eye member which is positioned against the said one end of the rod for welding may be a flat surface as opposed to a rounded cylindrical surface in order to further insure a uniform annular weld prior to splitting the rod end or bifurcation after welding. It is further preferable that the side surface of the eye member which is to be welded to the rod end be slightly larger or at least as large in surface area as the largest diameter or cross dimension of the rod to further insure a good weld connection.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 4 is a plan view of a metal eye member, which is already split in half, positioned against the end of the rod preliminary to the step of welding to illustrate a modified version of the first step of the method of the present invention in manufacturing a metal rod connecting member having at least one bifurcated clevis end.

FIG. 5 is a plan view of the combination illustrated in FIG. 4 after subsequent method steps in accordance with the teachings of the present invention have been carried out thereon and illustrates a finished metal rod connecting member with one bifurcated clevis end, with portions removed and cross-sectional configurations illustrated.

FIG. 6 is a view in side elevation of the rod connecting member illustrated in FIG. 5.

FIG. 7 is a view in side elevation illustrating a modification of the connecting member shown in FIG. 6, the modification being that the eye member is provided with a plurality of transverse bores therethrough for adjustable clevis pin connection.

DETAILED DESCRIPTION OF THE PREFERRED EMBODIMENTS

Figure 1:
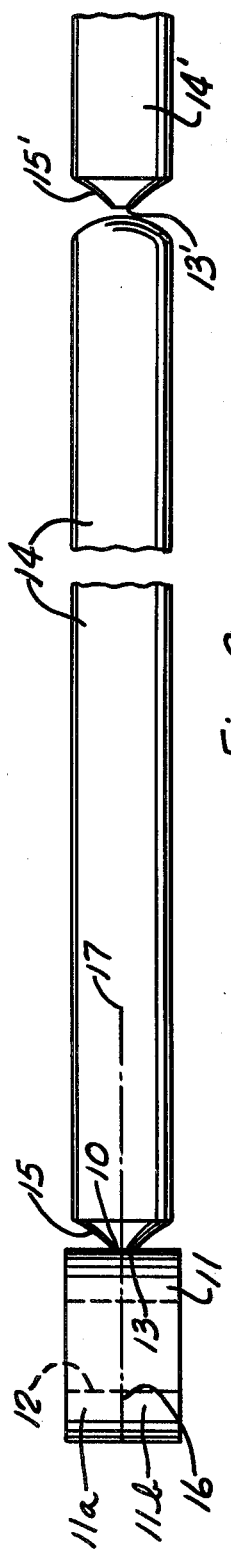
FIG. 1 is a plan view illustrating the initial method step of the present invention wherein the outside side surface of a metal eye member having a bore therethrough is transversely positioned against one end of a metal rod, with cross-sectional configurations thereof illustrated.

Referring to FIG. 1, this Figure represents the first method step that is carried out toward the manufacture of a metal rod connecting member having a bifurcated clevis end in accordance with the teachings of the method of the present invention. The clevis end connecting member being constructed here is a brake cylinder push rod for a railroad car. First, an outside surface 10 of metal cylindrical eye member 11 having bore 12 therethrough, is transversely positioned against one end 13 of metal rod 14. This positioning step may be done in any conventional manner, such as by a simple machine jig or other conventional clamping type devices. The metal eye member 11 and the metal rod 14 are constructed from any readily-weldable metal, such as steel.

In this Figure, metal eye member 11 is premachined or formed as one solid piece. Metal rod 14 may be supplied by segmenting a longer bar through the use of a conventional bar cut-off machine. This is illustrated in FIG. 1 by steel rod 14', which immediately follows steel rod 14, and represents the next bar or rod segment from which the rods 14 and 14' were segmented.

Note that the ends 13 and 13' of rods 14 and 14' respectfully are provided with annular taper 15 and 15'. This provides an annular welding relief between rod end 13 and eye member 11 so that in the next step of welding, a good annular weld, which is uniform and concentric, may be made between the end 13 of rod 14 and eye member 11. Thus, in the next step of manufacture, end 13 of rod 14 is circumferentially welded in this relief area to side surface 10 of eye member 11. This weld may be carried out manually, however, the configuration of the weld and the two members being welded together readily lends itself to automatic welding machines, as only one single and continuous annular weld need be made and the annular relief between the two members provides for a strong annular weld between them.

In the next step of the method of the present invention, after the annular weld has been accomplished, eye member 11 is transversely cut in half along center line 16, which is in line with the axis of rod 14 by any conventional cold working saw, such as a band saw or reciprocating saw. This cut of course, leaves a gap between the two halves, which are designated as eye member halves 11a and 11b. Then the axial cut is continued through the one end 13 of rod 14 to a predetermined bifurcation depth indicated at 17 to provide a bifurcated rod end and, of course, the cut will leave a bifurcation gap which is aligned with the cut gap between the two eye member halves 11a and 11b. This resultant bifurcated rod end is then spread and reshaped by conventional cold working techniques forming a clevis end 18 illustrated in FIGS. 2 and 3 with the bores 12a and 12b of eye member halves 11a and 11b positioned in spaced alignment to subsequently receive a clevis pin therethrough. The resultant brake cylinder push rod is shown in FIGS. 2 and 3.

The resultant brake cylinder push rod is as strong as the conventional drop forged brake rods, yet the use of expensive hot forge operations or hot saw operations has been completely eliminated, requiring not only less expensive steps of manufacture, but a method of manufacture which is much simpler to carry out with less manpower and relatively low costing machinery. By first providing a good continuous and concentric weld between rod 14 and eye member 11 before providing the bifurcation cut in end 13 of rod 14, a good weld is assured between the bifurcated end of rod 14 and eye member halves 11a and 11b, as the cut is made through the weld after welding. This weld is illustrated at 19 in FIGS. 2 and 3. To the contrary, if this weld between the bifurcated ends of rod 14 and eye member halves 11a and 11b were made after bifurcation of rod 14, it is obvious that the odd configuration of the weld area would provide a very awkward weld which could not be considered as strong, and in addition, considerably more time and labor would be required to make a weld at such a time in the steps of manufacture.

Figure 2:
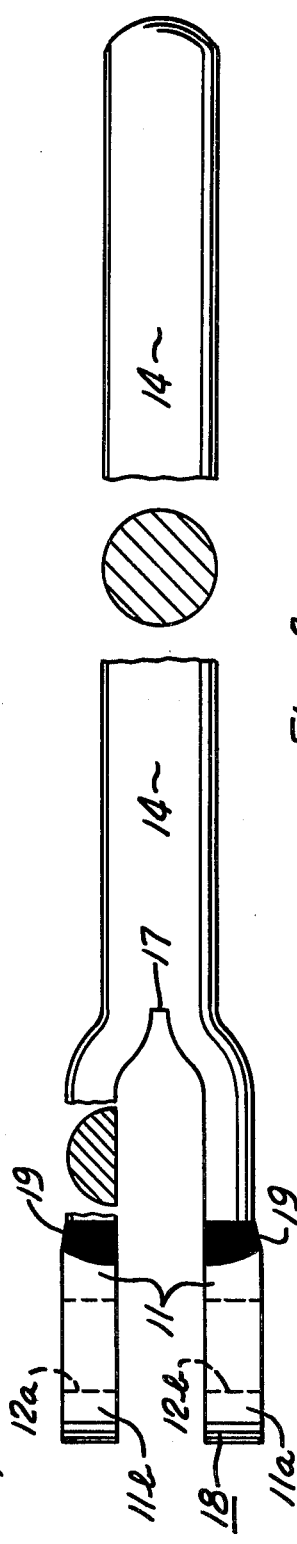
FIG. 2 is a plan view of the assembly illustrated in FIG. 1 after successive method steps of welding the rod end to the eye member, bifurcation cutting of the rod end and bifurcation spreading and re-shaping of the rod end has been completed to form the clevis end of the metal rod connecting member, with cross-sectional configurations thereof illustrated.
Figure 3:
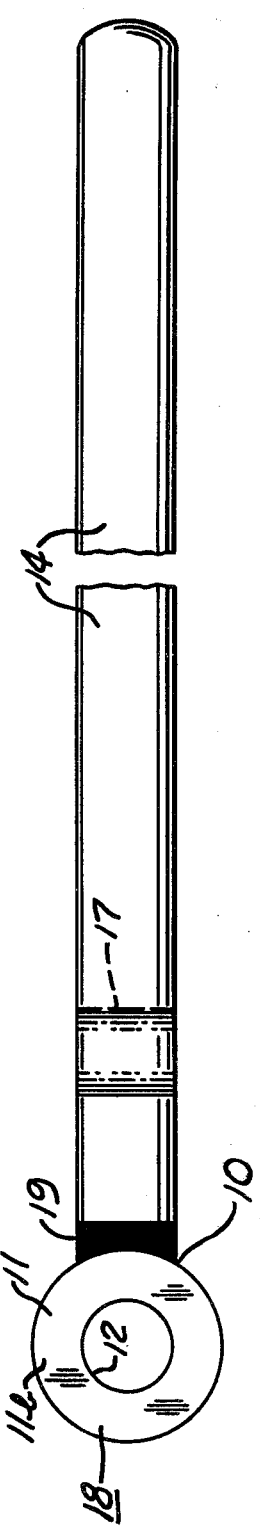
FIG. 3 is a view in side elevation of the metal rod connecting member illustrated in FIG. 2.

Referring next to FIGS. 4, 5 and 6, a modification of the method illustrated in FIGS. 1, 2 and 3 is illustrated. In FIGS. 4, 5 and 6, a railroad car truck lever connection is being manufactured. Like elements are designated with the same reference numerals as those given in FIGS. 1, 2 and 3.

With particular reference to FIG. 4 first, here the other end 20 of rod 14 is also cut off with a taper so that this end 20 of rod 14 may also be provided with a bifurcated clevis by the method previously described or by the method to be described hereinafter with regard to FIGS. 4, 5 and 6, which is basically the same method with minor modifications. In FIG. 4, the method steps are carried out in the same manner as with FIGS. 1, 2 and 3, with the exception that eye member 11 is already divided into two halves 11a and 11b prior to positioning eye member 11 against end 13 for welding. This saves the requirement of having to cut eye member 11 in half after the welding operation. This can be particularly convenient when the eye member 11 is of considerable depth, such as is the case wherein the eye member 11 is provided with a plurality of transverse bores 12 therethrough, as illustrated in FIG. 7, to provide an adjustable clevis pin connection. Nevertheless, the bifurcation cut made along line 17 in an end 13 of rod 14 is still not carried out until the annular weld 19 has first been made in the weld relief or clearance provided between the tapered end 13 of rod 14 and the side surfaces 10 of eye members 11a and 11b. This assures a good and solid continuous and concentric annular weld as described in connection with the discussion of FIGS. 1, 2 and 3.

Note also in FIGS. 4, 5 and 6, side surface 10 of eye member 11 is flat as opposed to the cylindrical surface 10 illustrated in FIGS. 1, 2 and 3. This provides for a more uniform weld between rod end 13 and eye member 11 at all positions or points around the annular weld relief. This flat surface 10 is also utilized in the configuration shown in FIG. 7. Note also that this area 10 is preferably at least as wide as the largest diameter of rod 14 to provide maximum welding area.

The eye member 11 of FIGS. 4, 5, 6 and 7 is readily constructed prior to assembly and manufacture of the rod 14 by conventional methods such as stamping or flame cutting from stock plate steel or metal in mass production quantities. The eye member 11 of FIGS. 1, 2 and 3 may be machined from bar stock or tubing.

I claim:

1. A method of manufacturing a metal rod connecting member having at least one bifurcated clevis end with aligned transverse bores to receive a connecting or clevis pin therethrough, comprising the steps of positioning an outside side surface of a metal eye member having a bore therethrough against one end of a metal rod with the bore running transverse to said rod, circumferentially welding said one rod end to said eye member side surface, thereafter transversely cutting said eye member in half to provide a gap therebetween in line with the axis of said rod, then axially cutting said one end of said rod to a predetermined depth to provide a bifurcated rod end and a bifurcation gap aligned with said gap between said eye member halves, and then spreading and re-shaping said bifurcated rod end to form a clevis end with the bores of said eye member halves in spaced alignment to receive a clevis pin.

2. The method of claim 1, wherein said eye member is provided with a plurality of transverse bores therethrough for adjustable clevis pin connection.

3. The method of claim 1, wherein said side surface of said eye member positioned against said one end of said rod is flat.

4. The method of claim 1, wherein said one end of said rod is tapered to provide an annular welding relief between said rod end and said eye member.

5. The method of claim 4, wherein said side surface of said eye member is at least as long as said rod is wide in its largest diameter.

6. A method of manufacturing a metal rod connecting member having at least one bifurcated clevis end with aligned transverse bores to receive a connecting or clevis pin therethrough, comprising the steps of pre-positioning a pair of metal eye members in spaced parallel alignment with each other, said metal eye members each having a bore therethrough and said bores being axially aligned with each other, further positioning outside side surfaces of said metal eye members against one end of a metal rod in said pre-positioned arrangement with the bores of said eye members running transversely to said rod, circumferentially welding said one rod end to said side surfaces of said eye members, thereafter axially cutting said one end of said rod in alignment with the spacing between said eye members to a predetermined depth to provide a bifurcated rod end and a bifurcation gap aligned with the spacing between said eye members, and then spreading and reshaping said bifurcated rod end to form a clevis end with the bores of said eye members in spaced alignment to receive a clevis pin.

7. The method of claim 6, wherein said eye members are provided with a plurality of transverse bores therethrough for adjustable clevis pin connection.

8. The method of claim 6, wherein said side surfaces of said eye members positioned against said one end of said rod are flat.

9. The method of claim 6, wherein said one end of said rod is tapered to provide annular welding relief between said rod and said eye members.

* * * * *